United States Patent [19]

Baniel

[11] Patent Number: 5,618,325
[45] Date of Patent: Apr. 8, 1997

[54] METHOD OF MANUFACTURING A MULTI-COMPONENT GLASS CYLINDRICAL PART IN THE FORM OF A TUBE AND/OR ROD

[75] Inventor: Pascal Baniel, Draveil, France

[73] Assignee: Alcatel Fibres Optiques, Bezons Cedex, France

[21] Appl. No.: 266,584

[22] Filed: Jun. 28, 1994

[30] Foreign Application Priority Data

Jul. 6, 1993 [FR] France .................................. 93 08283

[51] Int. Cl.$^6$ .................................................. C03B 19/00
[52] U.S. Cl. .......................... 65/380; 65/374.15; 65/25.1; 65/388; 65/404; 65/407; 385/123
[58] Field of Search .................... 65/374.15, 25.1, 65/182.2, 380, 388, 404, 407, DIG. 16; 385/123

[56] References Cited

U.S. PATENT DOCUMENTS

| | | |
|---|---|---|
| 3,966,446 | 6/1976 | Miller . |
| 4,017,288 | 4/1977 | French et al. . |
| 4,212,660 | 7/1980 | Maurer . |
| 4,227,771 | 10/1990 | Nolan . |
| 4,229,067 | 10/1980 | Love ........................................ 385/124 |
| 4,617,041 | 10/1986 | Meerman .................................. 65/404 |
| 5,185,020 | 2/1993 | Satoh ......................................... 65/404 |
| 5,350,433 | 9/1994 | Baniel ...................................... 65/25.1 |

FOREIGN PATENT DOCUMENTS

| | | | |
|---|---|---|---|
| 1448080 | 9/1976 | United Kingdom . | |
| 2129418 | 5/1984 | United Kingdom ..................... | 65/404 |

*Primary Examiner*—John Hoffmann
*Attorney, Agent, or Firm*—Sughrue, Mion, Zinn, Macpeak & Seas

[57] ABSTRACT

Method of manufacturing a multi-component glass cylindrical part comprising the operations of providing a vertical cylindrical cavity lined with porous membranes whose inside dimensions are very slightly larger than those of the glass cylindrical part and in which can slide a cylindrical pedestal, providing a seed mass of the glass on the pedestal, heating the seed mass until it melts, injecting a gas continuously into the porous membranes to form and maintain a layer of gas between the porous membranes and the molten seed mass preventing any contact between the molten seed mass and the porous membranes, feeding the molten seed mass from the top of the cavity by continuously dispensing a powder made up of the components of the glass, varying the composition of the powder as the cylindrical part is formed, so that the glass cylindrical part has a composition that varies in the longitudinal direction, and lowering the pedestal as the cylindrical part is formed.

15 Claims, 9 Drawing Sheets

METHOD OF MANUFACTURING A MULTI-COMPONENT GLASS CYLINDRICAL PART IN THE FORM OF A TUBE AND/OR ROD

The present invention concerns a method of manufacturing the core rod and the cladding tube(s) constituting an optical fiber preform made from a multi-component glass, i.e. a glass made up of various constituents such as ZBLAN types of fluorinated glass and oxide types of glass based on silica, as well as an optical fiber made from a preform of this kind by drawing.

BACKGROUND OF THE INVENTION

The invention concerns optical lines for communication and for sensing in which a communication or sensing light signal is transmitted by an optical fiber or by a plurality of optical fibers connected together. So-called special optical fibers having a specific function are often inserted into the length of a communication or sensing line made up of conventional optical fibers (called normal fibers because their main function is to transmit the light signals), or else they are connected to one end of the line.

Special optical fibers can have several functions:

they can act as sensors, especially if the optical line in question is a sensing line, they can act as optical amplifiers, optical isolators, optical circulators, etc inserted into the length of a communication line, in the case of interconnecting two communication lines having different core diameters, they can be used to match the core diameters to each other, they can be used to increase the light power injected into a communication or sensing line.

U.S. Pat. No. 3,966,446 describes a method of manufacturing an optical fiber preform whose refractive index varies longitudinally, a fiber of this kind being used, for example, to reduce mode dispersion in transmitted optical signals. The method described entails depositing glass soot whose composition is varied in time, for example by adding dopants to modify the refractive index in the axial direction of the preform.

That prior art method cannot produce fibers of the required quality if the parent glass is a multi-component glass.

OBJECTS AND SUMMARY OF THE INVENTION

An object of the present invention is to provide a method of manufacturing an optical fiber preform with optical properties which can be varied in the longitudinal direction and which is made from a multi-component glass.

To this end the present invention proposes a method of manufacturing a multi-component glass cylindrical part in the form of a tube and/or rod, the method comprising the following operations:

use is made of a vertical cylindrical cavity lined with porous layers whose inside dimensions are a few tens of microns larger than said part and in which can slide a cylindrical pedestal constituting a support for said part, a seed mass of said glass is provided on said pedestal, said seed mass is heated until it melts and a gas is injected continuously into said porous layers to maintain between them and said molten seed mass a layer of gas a few tens of microns thick preventing any contact between them, said molten seed mass is fed from the top of said cavity by continuously dispensing a powder made up of the constituents of said glass, and the composition of the powder is varied as said cylindrical part is formed, so that said glass constituting said cylindrical part has a composition that varies in the longitudinal direction, said pedestal is lowered as said cylindrical part is formed from said seed mass.

For example, the composition of the powder made up of the constituents of the glass is varied at predetermined times during the execution of the method by adding one or more constituents to a powder made up of parent constituents.

The powder made up of the constituents of the glass is fed by straight or helical feed means oriented towards the top of the cavity.

Highly advantageously:

the pedestal is a hollow cylindrical body closed at the bottom by a piston, the pedestal initially contains a solid charge of glass adapted to form said seed mass, the seed mass is extracted gradually from the pedestal in the molten state by pushing up the piston.

This method advantageously enables continuous preparation of an extremely pure multi-component glass cylindrical part using a continuous feed of powder materials whose composition can be varied at will by adding or removing one or more components to obtain the required composition profile along the manufactured part. Also, the cylindrical parts manufactured by this method are perfectly sized and have very good surface and volume optical properties.

This method also ensures that the bath obtained by melting the seed mass is highly homogeneous. The constituents added are therefore very well dispersed, even if present in small quantities.

The present invention also concerns an optical fiber manufactured by drawing a preform comprising a rod surrounded by at least one tube made by the method of the invention including a core corresponding to the core rod surrounded by at least one optical cladding corresponding to the cladding tube, the composition of the core glass and/or that of the cladding glass varying longitudinally along the fiber.

This fiber has normal areas in which the compositions of the core glass and the cladding glass are called parent compositions and special areas in which the composition of the core glass and/or the composition of the cladding glass is different from the parent composition(s).

BRIEF DESCRIPTION OF THE DRAWINGS

Other features and advantages of the present invention emerge from the following description of a method of the invention for manufacturing a rod and a tube to form an optical fiber preform and from the examples of applications of various fibers made from preforms in accordance with the invention. The description and examples that follow are naturally given by way of non-limiting illustrative example only.

In the following figures.

Items common to more than one figure always carry the same reference numbers.

MORE DETAILED DESCRIPTION

Figure 1:
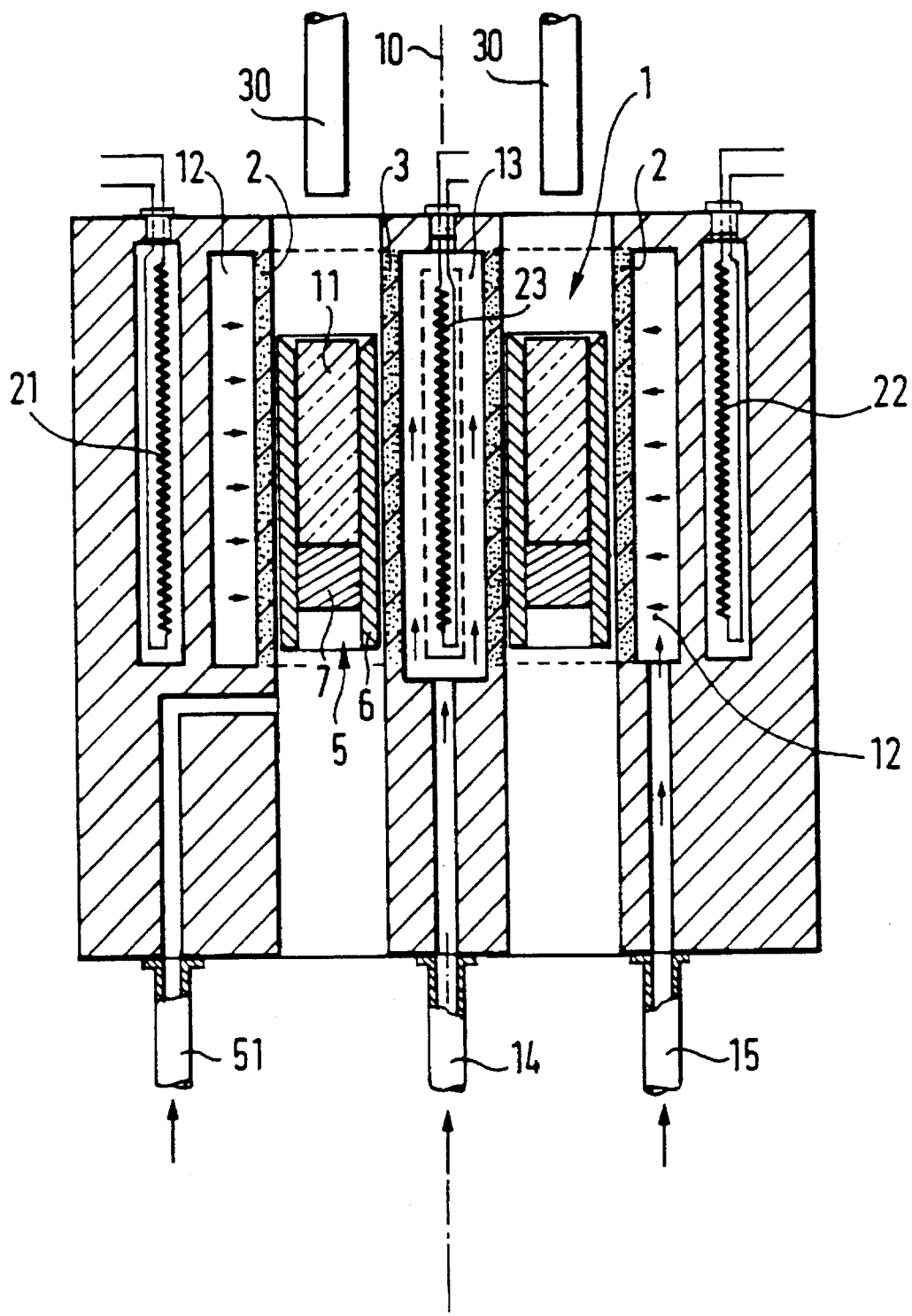
FIGS. 1 to 5 are diagrams showing one example of a device implementing the method of the invention to manufacture a tube from glass whose composition varies longitudinally.
Figure 2:
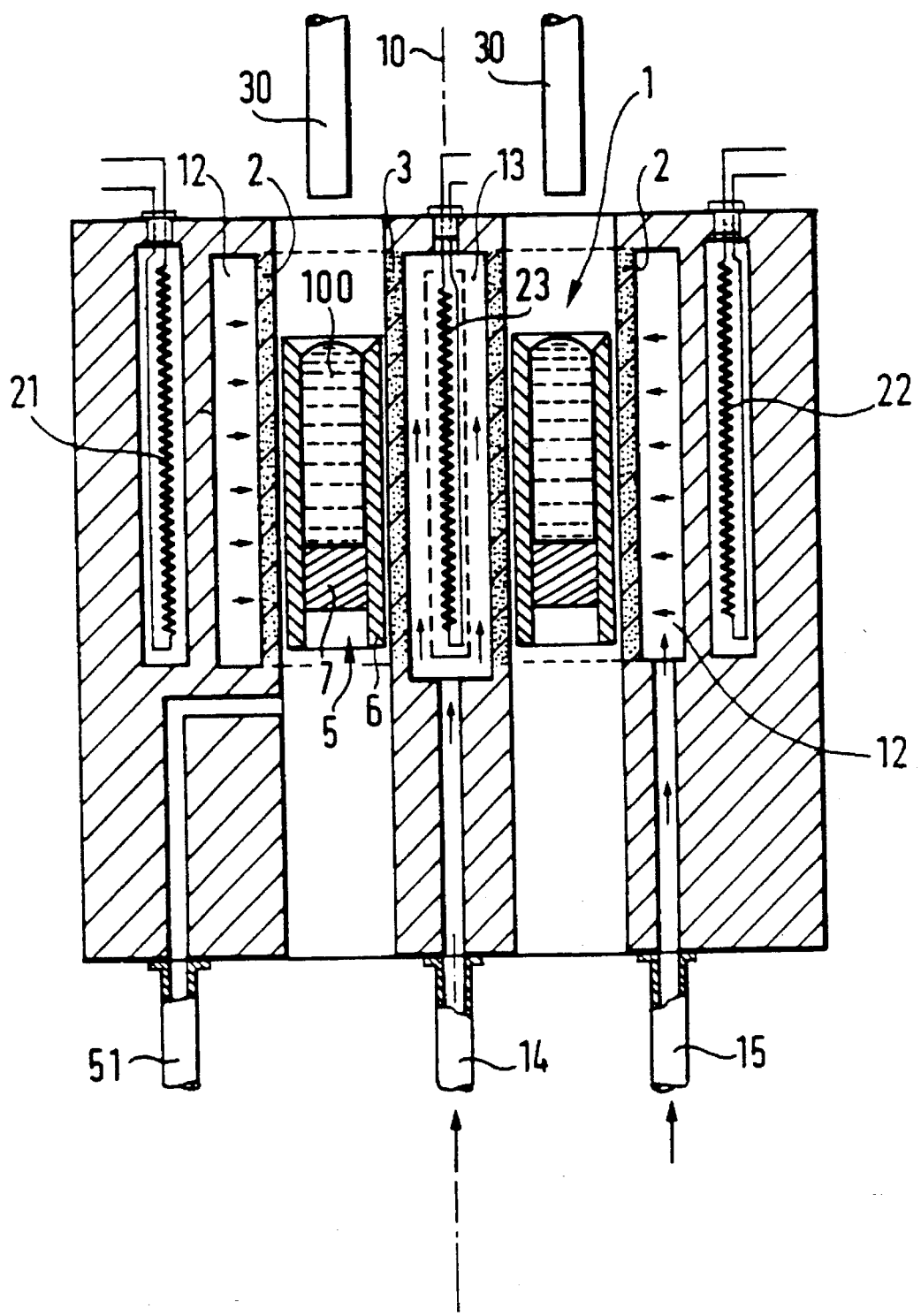
Figure 3:
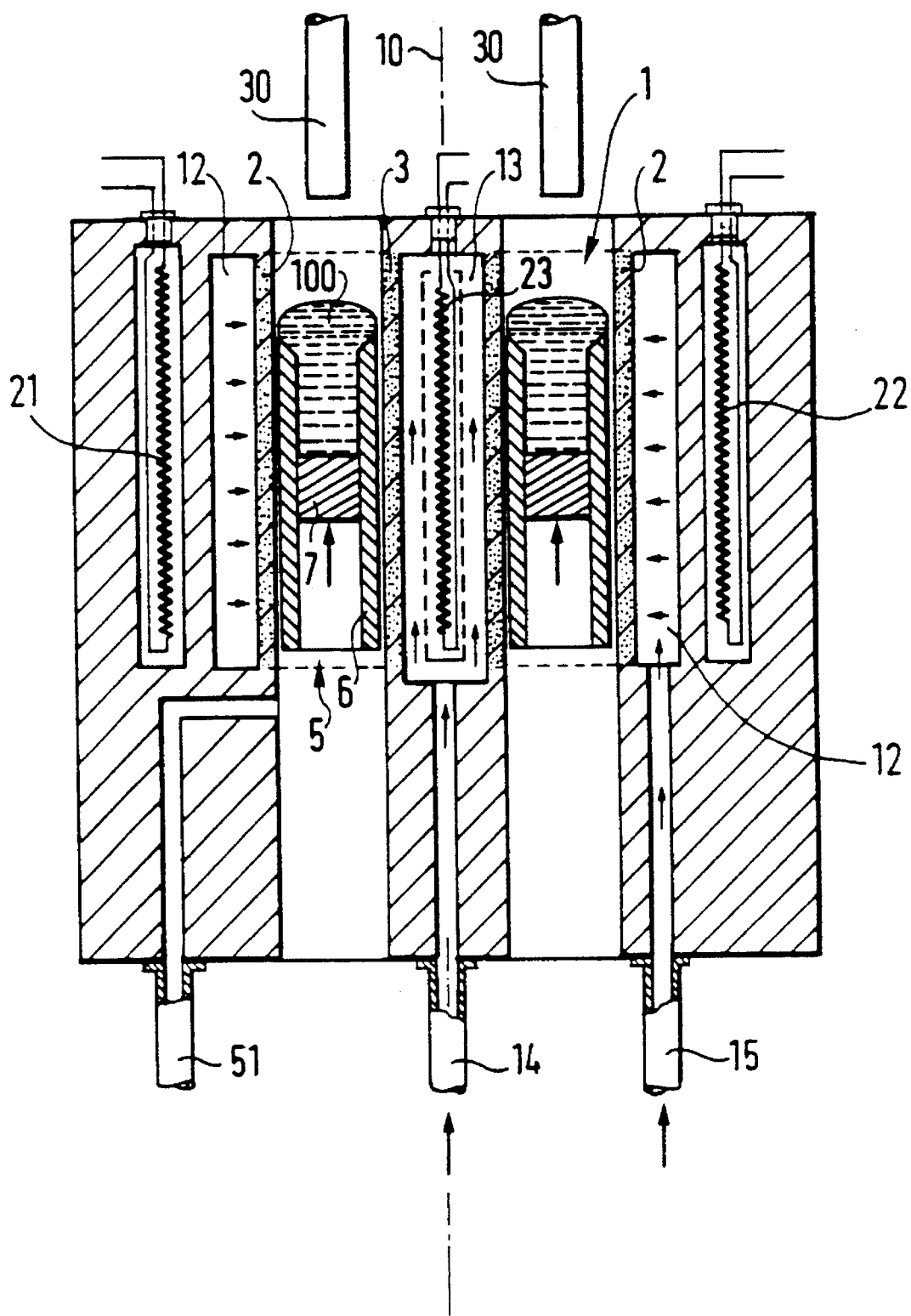

A method of manufacturing a preform in accordance with the invention from a core rod and a cladding tube is described with reference to FIGS. 1 to 7.

The manufacture of the cladding tube is described first. It is made from a ZBLAN type fluorinated glass, for example, i.e. a glass comprising the following constituents: $ZrF_4$, $BaF_2$, $LaF_3$, $AlF_3$, $NaF$.

The tube is 10 cm long, for example, and has an inside diameter of 15 mm and an outside diameter of 30 mm.

FIGS. 1 to 5 show in diagrammatic form a device comprising a vertical tubular cavity which is a solid of revolution about an axis 10 and is lined over part of its height with two coaxial porous layers 2 and 3 made from graphite with a Darcy permeability in the order of $10^{-15}$ $m^2$, possibly covered with a thin (for example 0.1 μm) layer of pyrolytic carbon made at high temperature, for example by pyrolysis of methane. The pyrolytic carbon can prevent deterioration of the layers 2 and 3 despite a highly corrosive environment due to the presence of fluorinated substances in the ZBLAN type glass.

The inside diameter of the layer 2 is 30.05 mm and the outside diameter of the layer 3 is 14.95 mm (with a tolerance of 0.01 mm for each diameter). The layers are preferably both 2 mm thick.

The lower part of the tubular cavity 1 not covered by the layers 2 and 3 has the same dimensions as the layers, with the same tolerances.

The layers 2 and 3 are fed with gas via respective coaxial hollow bodies 12 and 13 with gas inlets 14 and 15 at which the respective gas pressures are $P_1$ and $P_2$.

Variable height heating cartridges 21, 22, 23 are provided inside and outside the tubular cavity 1.

An annular pedestal 5 which is also a solid of revolution about the axis 10 can slide in the cavity 1. It has an annular cylindrical hollow body 6 closed at the bottom by an annular piston 7. All inside surfaces of the pedestal 5 which can come into contact with fluorinated substances can be covered with a thin layer of pyrolytic carbon.

Means (not shown) are provided for pushing the piston 7 up and the pedestal 5 down.

Means 30 are provided for continuously feeding into the upper part of the tubular cavity 1 a powder made up of the constituents of the glass in the various (special and normal) areas of the part to be made. A powder flowrate regulator system (not shown), familiar to the person skilled in the art, can also be provided.

The device as described can advantageously be installed in a sealed enclosure (not shown) filled with a neutral gas such as argon or helium. The gas constituting the atmosphere in this enclosure also confines the cylindrical part as it is formed.

At the start of the process of manufacturing the tube, a charge (seed mass) 11 of solid glass is introduced into the pedestal 5 at ambient temperature (see FIG. 1). The glass has the required ZBLAN type glass composition. The pedestal 5 is installed between the porous layers 2 and 3.

The method of the invention is as follows:

The glass charge 11 (or 100 in FIG. 2) is melted inside the pedestal 5 by the heater components 21 to 23 which heat it to a temperature in the order of 650° C. to 700° C.

Figure 4:
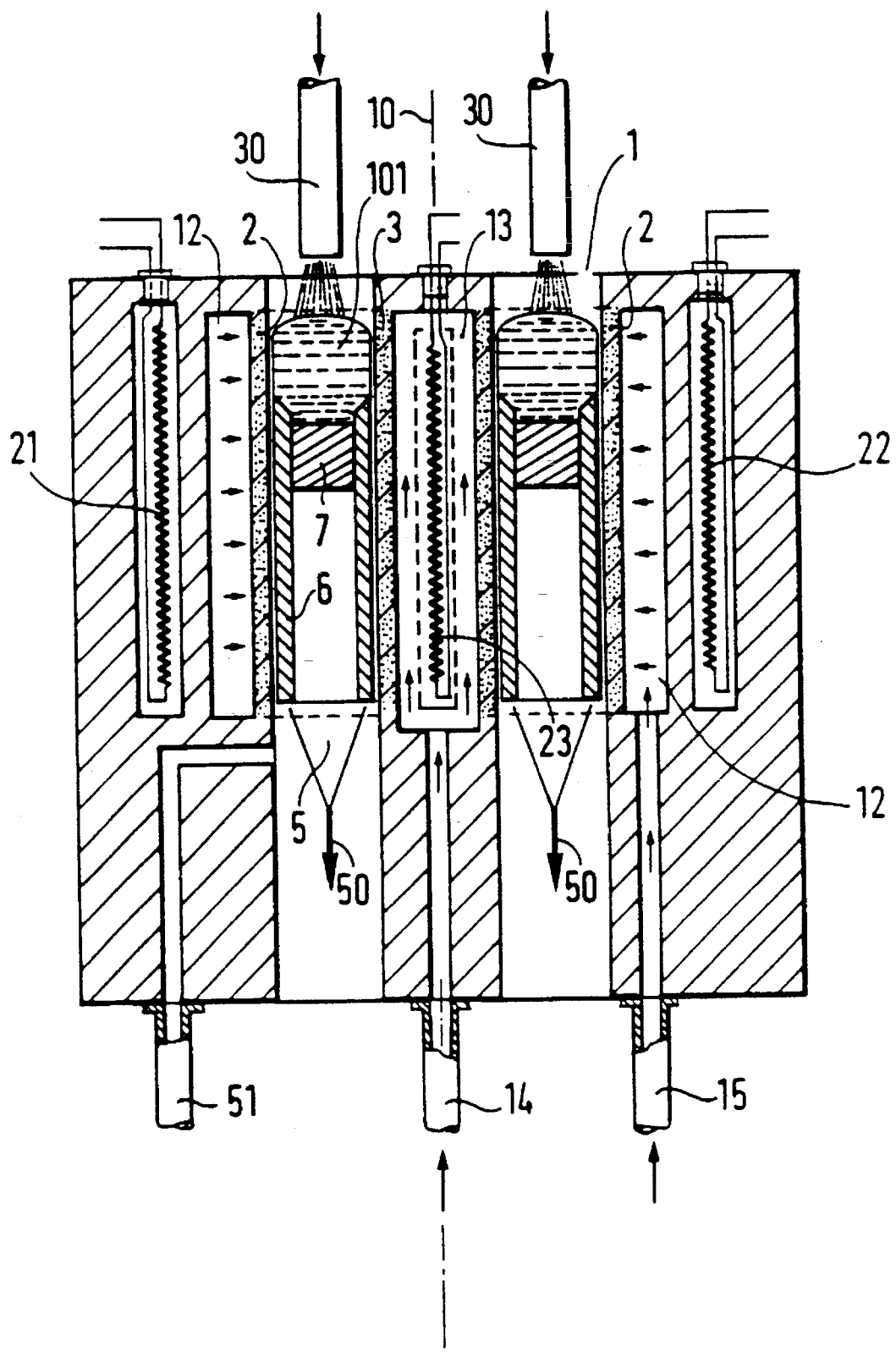

The piston 7 is then pushed up inside the pedestal 5 to produce, from the molten charge 100 (see FIG. 3), a molten seed mass 101 on top of the pedestal 5 (see FIG. 4).

At the same time the pressures $P_1$ and $P_2$ are increased 0.1 bar above atmospheric pressure to produce a layer of gas a few tens of microns thick between the layers 2 and 3 and the molten seed mass 101; a layer of gas is also maintained between these layers and the outside surface of the pedestal 5. The layer of gas confines the molten seed mass 101 and prevents contact between it and the cavity 1.

Also at the same time, the seed mass 101 is fed with the powder made up of the constituents of the glass from the dispensing means 30 (see FIG. 4) and the pedestal 5 is lowered (see arrows 50) at a rate of 0.5 mm/min, for example.

Figure 5:
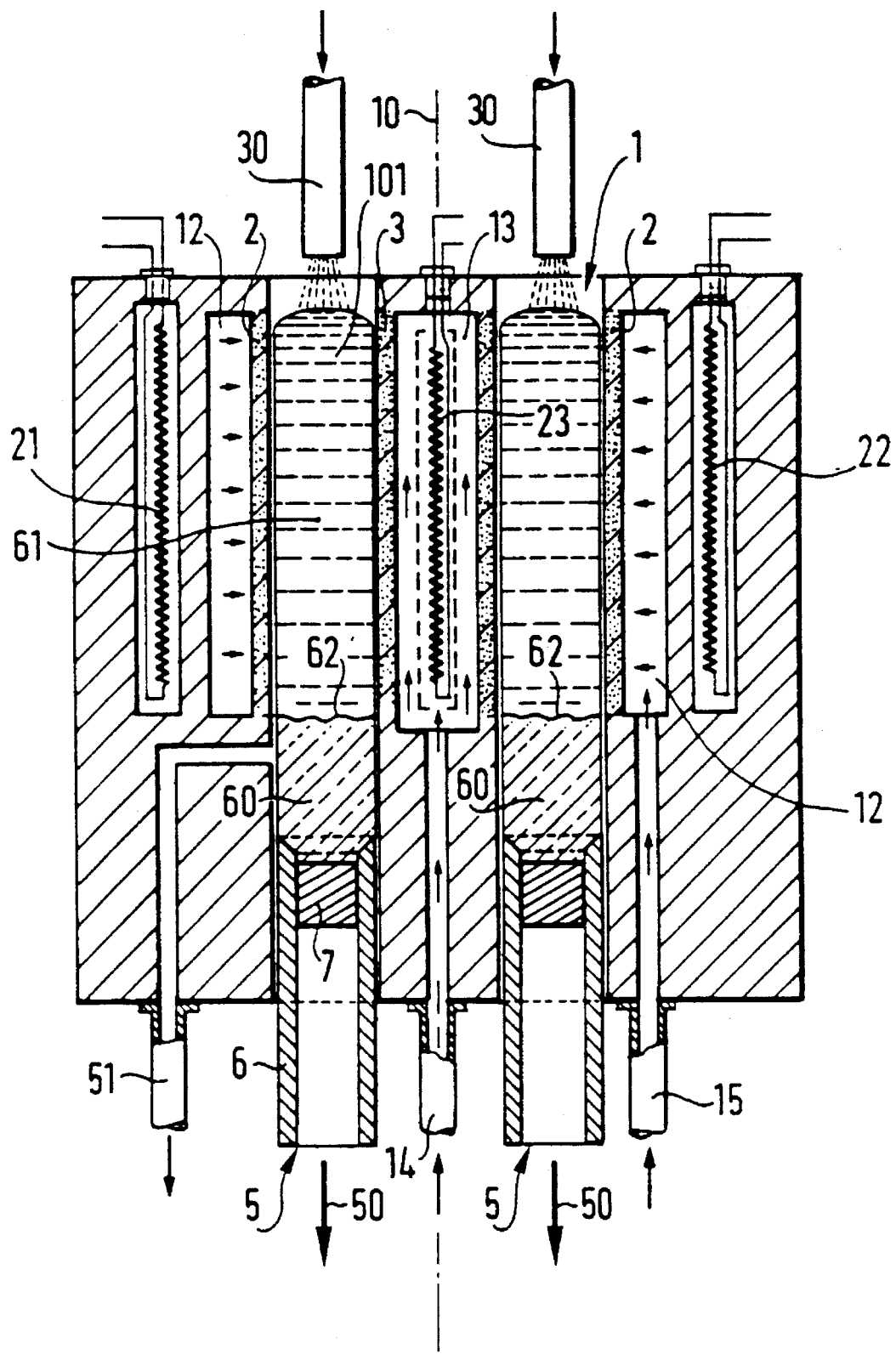
Figure 6:
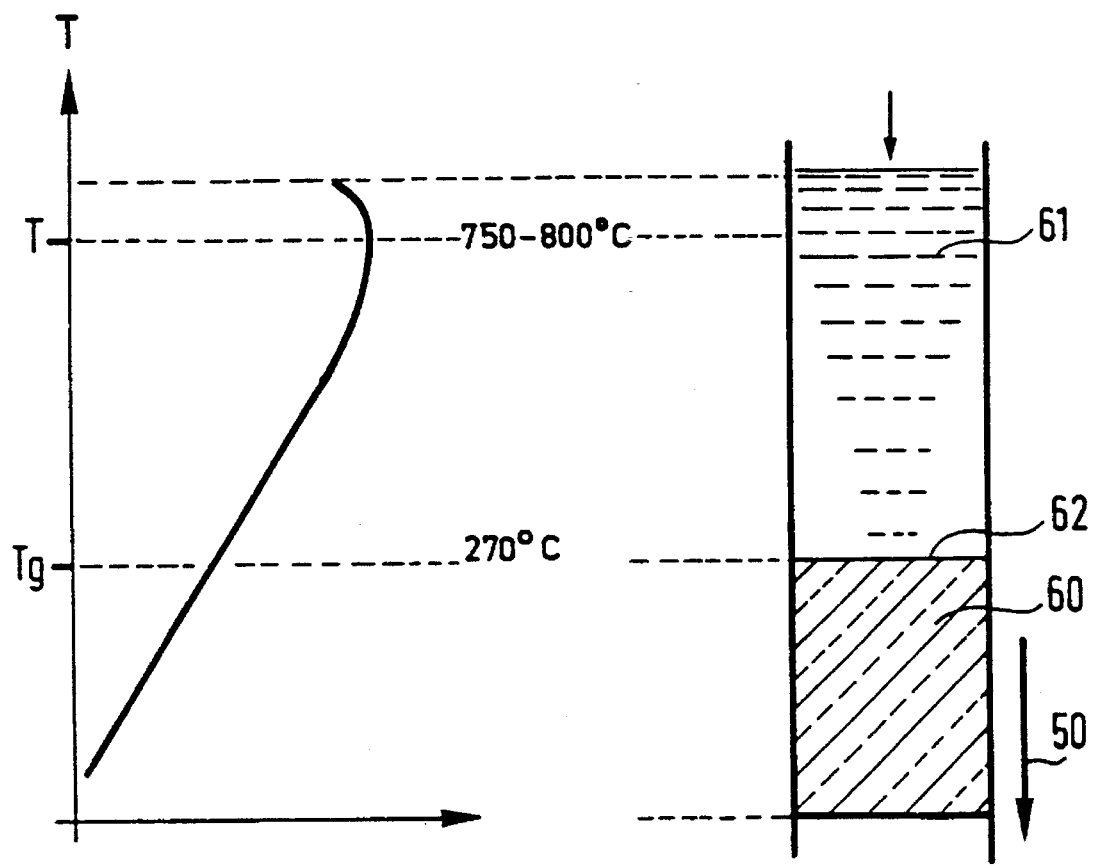
FIG. 6 shows the temperature distribution in the tube as it is formed.

The "steady state" after starting the process is shown in FIG. 5. The temperature profile along the tubular cavity is shown in the diagram in FIG. 6.

A portion of solid tube 60 surmounted by a column of molten glass 61 appears. The interface 62 corresponding to the glass transition temperature Tg of the glass (between +260° C. and +270° C.) is substantially at the bottom of the layers 2 and 3.

An area very near the top of the liquid column 61 is heated to a very high temperature, in the order of 750° C. to 800° C., to refine the glass, i.e. to eliminate any microbubbles that may form. The heated area is restricted to a few millimeters to achieve this refining without any risk of excessive decomposition of certain fluorinated substances (see FIG. 6).

The temperature gradient in the solid tube 60 is 100° C./cm, for example. It can be controlled by adding cooling systems (not shown).

A pressure sensor 51 near the interface 62 enables the two pressures $P_1$ and $P_2$ to be controlled to adjust the pressure field in the gas film so that the height of the column of molten glass 61 remains constant throughout the drawing operation.

The powder is fed continuously by the dispensing means 30 at a rate compatible with the rate of advance of the tube, of course. A sensor of the position of the upper surface of the column of molten glass 61 can be used for this purpose.

The tube can be moved vertically by known mechanical displacement systems, such as the HUNTINGTON MFL-133-6 system, for example. All operations can be controlled by a microcomputer controlling the pressures, and the rate of advance of the tube, and regulating the flowrate of the powder.

In accordance with the invention, the composition of the powder dispensed by the means 30 is varied, for example by adding appropriate constituents to the original ZBLAN glass powder at predetermined times during the manufacture of the tube. A plurality of powder distributors can be used for this, for example, one containing the parent ZBLAN glass powder and the others containing various constituents to be added to the parent glass to bring about the required longitudinal variations in composition.

The proportion of constituents to be added to the parent multi-component glass to obtain the specific properties required is usually low. It is therefore not indispensable to premix the constituents in the various dispensers, just introducing them into the same feed pipe being sufficient. A helical feed pipe can be used, for example, so that the various powders travel a greater distance together before reaching the molten seed mass 101. This achieves good mixing when this is required.

Figure 11:
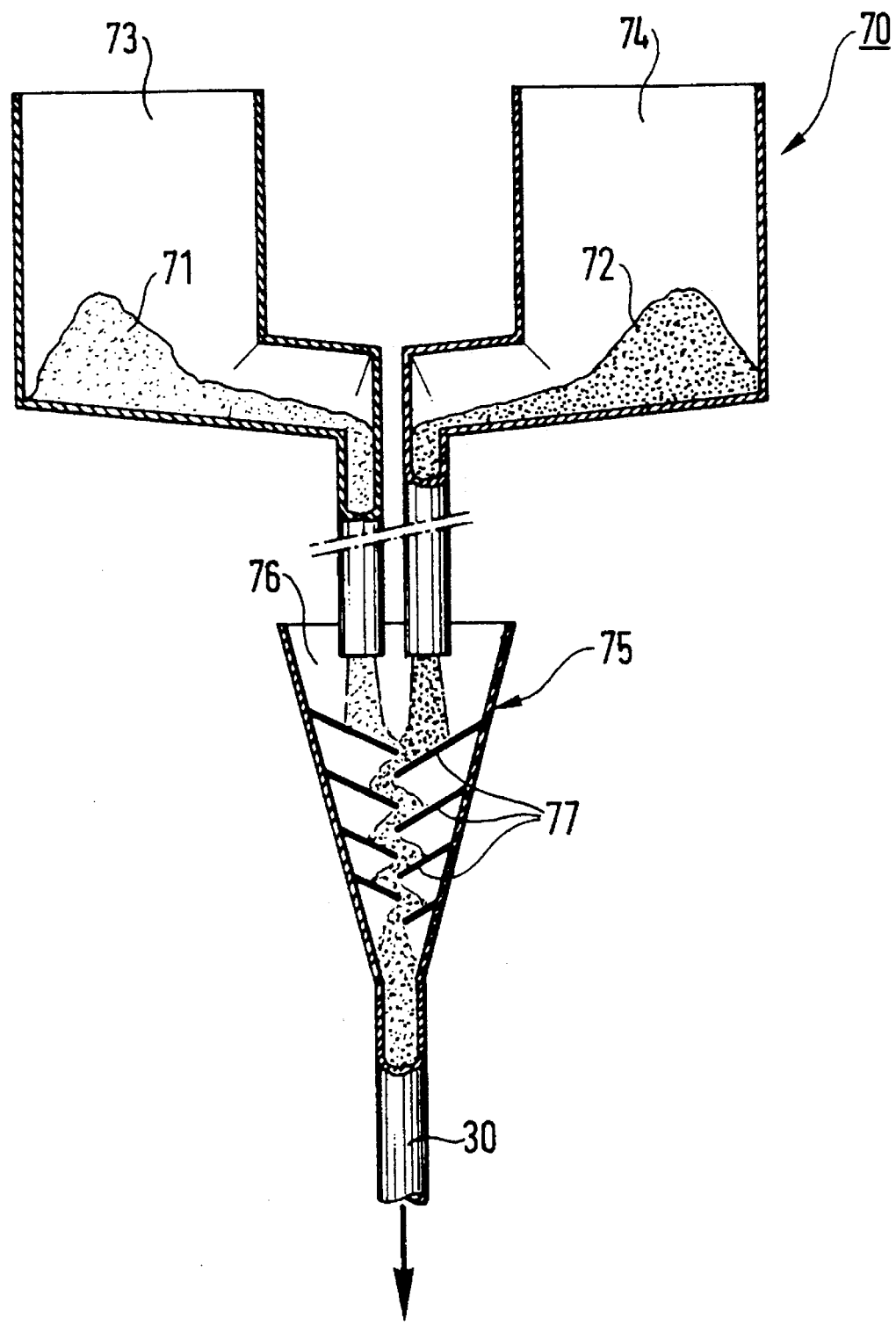
FIG. 11 is a diagram showing a powder feed device for the device of FIGS. 1 to 5 or 7.

FIG. 11 shows one example of a feed device that can be used with the device from FIGS. 1 to 5 or 7.

FIG. 11 shows in diagrammatic form a device 70 for feeding powder from two mixtures 71 and 72 with different compositions. The device 70 includes two containers 73 and 74 containing the different mixtures 71 and 72, respectively, a mixer 75 and one of the dispensing means 30.

When varying the composition merely requires the addition of one or more constituents (mixture 72, for example) to the parent nominal composition (mixture 71, for example), the feed is simultaneous with the respective flowrates of the mixtures 71 and 72 controlled separately to achieve the required stoichiometry. To improve the homogeneity of the final mix before it is deposited on top of the molten seed mass, in order to achieve fast and homogeneous melting of the added substances, the mixer 75 is advantageously used: this can simply be a funnel 76 fitted with chicanes 77 in the form of half-disks or helixes.

If the variation in composition is more complex and cannot be achieved simply by adding a second mixture such as the mixture 72, the mixture 71 is fed at first, and thereafter the mixture 72, to obtain the required index or composition variations. In this case, it is not necessary to use the mixer 75 if the mixtures have been homogenized beforehand.

Given that the tube being formed is moved longitudinally during manufacture, the variations in the composition of the powder dispensed by the means 30 result in longitudinal variations in the composition of the tube.

The manufacture of the core rod of an optical fiber preform in accordance with the invention will now be described. The rod is also made from a ZBLAN multi-component fluorinated glass whose composition is the same as that of the glass from which the tube is made or different.

Figure 7:
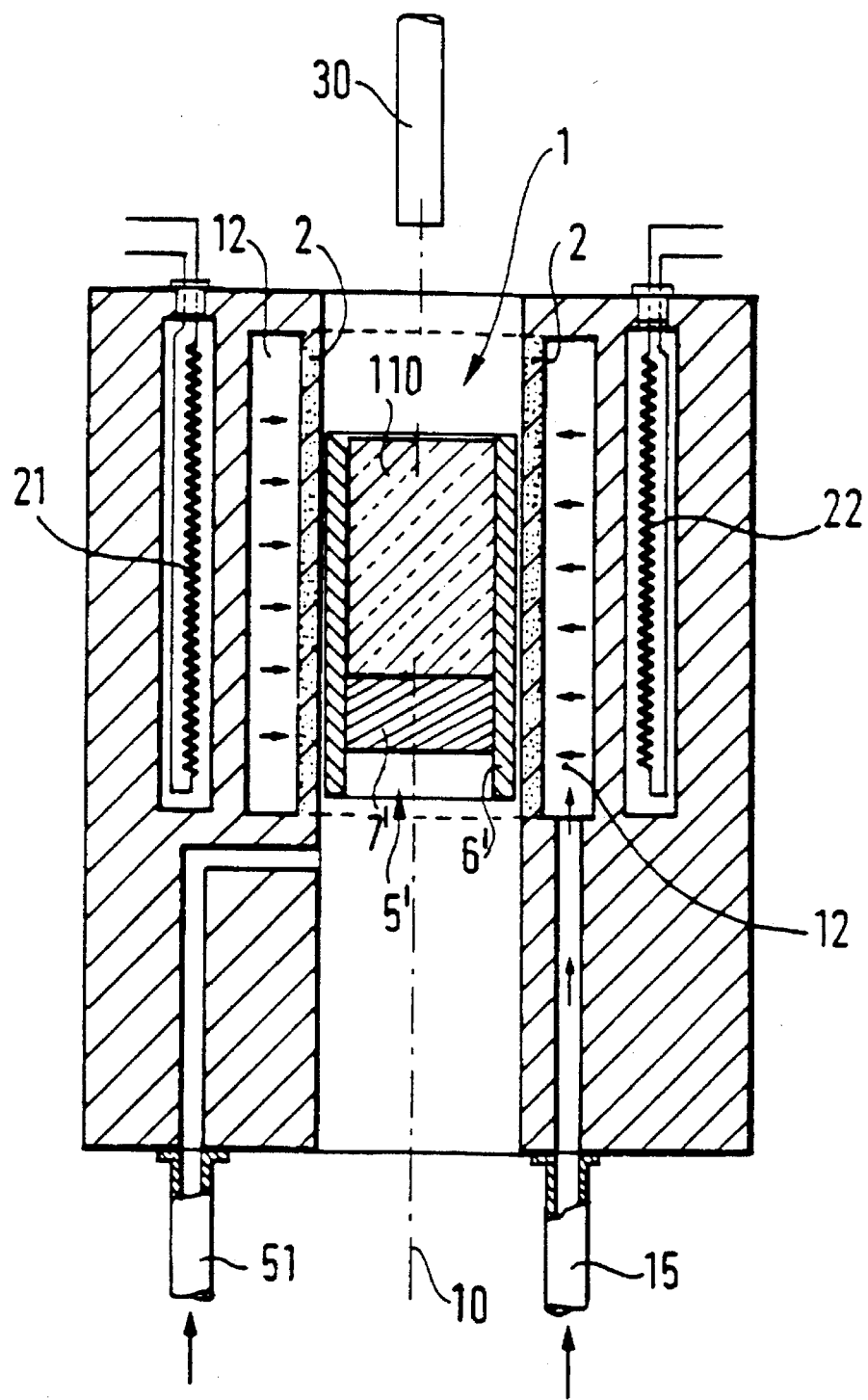
FIG. 7 is a diagram showing one example of a device implementing the method of the invention to manufacture a rod from glass whose composition varies longitudinally.

A device of the same type described with reference to FIGS. 1 to 5 is used, but adapted for manufacturing a rod. Accordingly, the cavity 1 is cylindrical, hollow and non-tubular, as shown in FIG. 7. The porous layer 3, the hollow body 13, the heating cartridge 23 and the gas inlet 14 are therefore dispensed with.

This device includes a porous layer 2 whose inside diameter is 15.095 mm and whose usable height is approximately 80 mm, machined from graphite with a Darcy permeability of $2.6 \times 10^{-15}$ m$^2$, for example. The associated pedestal 5' has a cylindrical hollow body, is about 50 mm high and has an outside diameter of 15.059 mm, i.e. there is a radial clearance of 18 μm at room temperature between the layer 2 and the pedestal 5'. The piston 7' closing the pedestal 5' is in the form of a disk with an outside diameter of 9.95 mm and moves inside the cavity in the body 6' of the pedestal 5', the diameter of this cavity being 10 mm. The pedestal 5' and the piston 7' can be covered on all sides with a thin layer of pyrolytic carbon to improve the properties of the supports (inert nature, anti-adhesion) in relation to the fluorinated glass.

The seed mass (charge) 110 of solid fluorinated glass with a diameter slightly less than that of the cavity inside the pedestal 5' and 27 mm high rests on the piston 7'. At room temperature the combination of the pedestal 5', the piston 7' and the solid seed mass 110 is surrounded by the porous layer 2.

All other parts of the device for manufacturing a rod are identical to those described with reference to FIGS. 1 to 5 for manufacturing a tube.

The device can be installed in a sealed tubular enclosure to operate in a controlled atmosphere.

Throughout the manufacture of the rod the enclosure is swept continuously with a very pure gas mixture at a flowrate of 2 liters per minute (l/min). The pressure of the confinement gas passing through the porous layer is regulated throughout the experiment to 120 mbars relative to the pressure inside the enclosure (close to atmospheric pressure). The confinement gas is of the same kind as the gas swept through the enclosure, for example (e.g. argon containing 5% by volume of sulfur hexafluoride $SF_6$).

All the specific arrangements just described can be applied in the same manner to the manufacture of a tube.

The method in accordance with the invention of manufacturing the rod comprises the following operations:

The seed mass 110 is introduced into the pedestal 5' which is surrounded by the porous layer 2.

The total flowrate of gas through the porous layer is adjusted to a value in the order of 0.135 l/min at room temperature.

The heating system (cartridges 21 and 22) is started up at a rate of 100° C./min until the temperature of the glass reaches 710° C. The glass constituting the seed mass 110 is molten at this temperature. It is held at 710° C. for about 15 minutes to achieve thermal equilibrium and to eliminate any gas bubbles originating at the interface between the glass and the pedestal 5'. The total flowrate of the confinement gas through the porous layer is then 0.06 l/min because of the increased temperature and the consequent increase in the viscosity of the gas.

The piston 7' is then raised in the cavity 1 at a rate of 2 mm/min over a total distance of 27 mm. The fluorinated bath consisting of the molten seed mass therefore rises slowly and is progressively extracted from the pedestal 5'. It is therefore confined between the walls of the porous layer 2, without touching the latter at any time, its confined height increasing at a regular rate. The gas film is therefore formed in a regular and reproducible manner. The foregoing operation is called injection of molten glass.

Once injection has been completed, the temperature of the bath is raised to 750° C. and held there for 15 minutes for the refining operation.

The confined seed mass is then fed with powder made up of the constituents of the glass from the dispensing means 30 and, at the same time, the combination of the pedestal 5', the piston 7' and the confined fluorinated bath is moved downwards at a constant rate of 2 mm/min, with the conditions for the various gas flows being the same; the glass is continuously cooled with an average thermal gradient of −75° C./cm between 620° C. and 310° C., representing a cooling rate of −15° C./min. Cooling is completed at a rate of −7.5° C./min to the glass transition temperature before the solid glass sample passes the lower limit of the porous layer 2. During this movement and cooling of the fluorinated bath there is no wetting of the wall by the glass and the pressure conditions remain constant with time.

Still in accordance with the invention and as during manufacture of the tube as previously described, the composition of the powder dispensed by the means 30 is varied, for example by adding to the initial ZBLAN glass powder certain appropriate constituents.

The conditions for manufacture of a glass tube are substantially the same as for a glass rod. The pedestal/layer combinations have similar values, for both the inner layer and the outer layer in the case of the tube.

Preparation of the glass seed mass by gaseous confinement establishes a film of gas over a height of a few millimeters to confine the charge and to enable manufacture to continue by the continuous addition of powders.

The use of a seed mass and where applicable of the "pedestal-injector" produces a very regular gas film and thus a simple and reproducible way to prepare a tube or a rod whose final purity depends only on the initial purity of the starting products (the powders used), the gas reagents and the graphites employed.

The advantage of the gas film confinement technique is that there is no further contamination from contact between the molten bath and the walls during manufacture. The absence of any molds for manufacturing the tube or the rod and therefore of subsequent mechanical and/or chemical polishing of the confined surfaces further enhances the quality of the parts produced.

A glass rod and tube can therefore be manufactured this way having a composition varying in the longitudinal direction and forming an optical fiber preform. To this end a core glass rod and a cladding glass tube are prepared as previously described.

The heights of the tube and the rod can be set at 10 cm (but can be much greater, of course). The core glass rod has a mean outside diameter of 10.00 mm, for example, and the cladding glass tube an inside diameter of 10.05 mm and an outside diameter of 20.00 mm. These precise dimensions are obtained by an appropriate choice of the dimensions of the various parts involved in the above method (porous layers, pedestals, etc).

The rod is then inserted in the tube, for example using a technique well-known to the person skilled in the art under the name "rod-in-tube", to form a preform. The fit between the rod and the tube is virtually perfect given their very close tolerance dimensions.

The resulting preform is transferred to a drawing tower and heated to an appropriate temperature, around 310° C., for example, and the drawn fiber is homeomophic to the starting preform. In the foregoing example, for a total fiber diameter of 125 µm the core has a diameter in the order of 62.5 µm. The fiber is therefore a multimode fiber.

To prepare a monomode fiber from the above preform a coarse intermediate fiber can be prepared first with a diameter of a few millimeters. This coarse fiber is then fed into another cladding glass tube prepared by the above method or by some other conventional method since the quality of the glass is less important for the interface between the first and second cladding.

Given that the above method results in a molten bath (the molten seed mass) of excellent homogeneity, the powdered constituent dispensed by the means 30 is very well dispersed, regardless of its composition. In particular, even if the concentration of one added constituent is very low, it is homogeneously dispersed in the final part.

The resulting longitudinal variations in the composition of the final tube or rod procure longitudinal variations in the optical transmission and guidance properties of the resulting preform.

Note, however, that the minimal length of the tube and/or the rod over which such variation can be obtained depends on:

the minimal depth of the molten bath to melt the added powder and homogenize the bath in the area of contact with the molten powder, the powder feed rate and therefore the rate at which the pedestal is lowered and the rate at which the bath is cooled.

In the case of a tube and a rod made from fluorinated glass, variations in the composition of the preform over lengths in the order of 25 mm at least can be achieved in practise.

If an optical fiber preform is made from this rod and this tube in the manner previously described, the fiber obtained by drawing the preform includes one or more special areas each having a length in the order of several hundred meters for a core rod diameter of 10 mm and a fiber core diameter of 50 µm.

Various fibers obtained by drawing preforms in accordance with the invention and some of their applications are now described by way of example.

Figure 8:
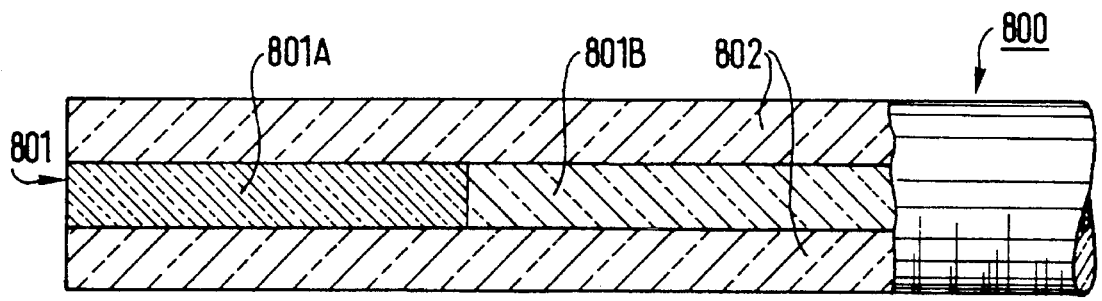
FIG. 8 shows in diagrammatic longitudinal section a first optical fiber made from a preform in accordance with the invention.
Figure 9:
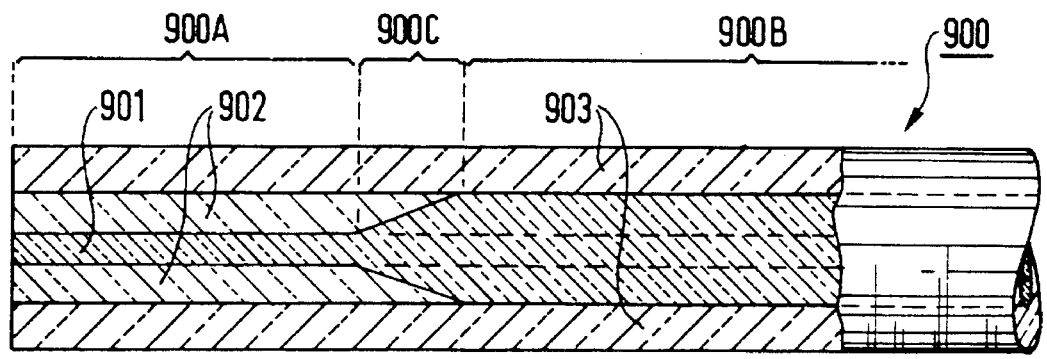
FIG. 9 shows in diagrammatic longitudinal section a second optical fiber made from a preform in accordance with the invention.
Figure 10:
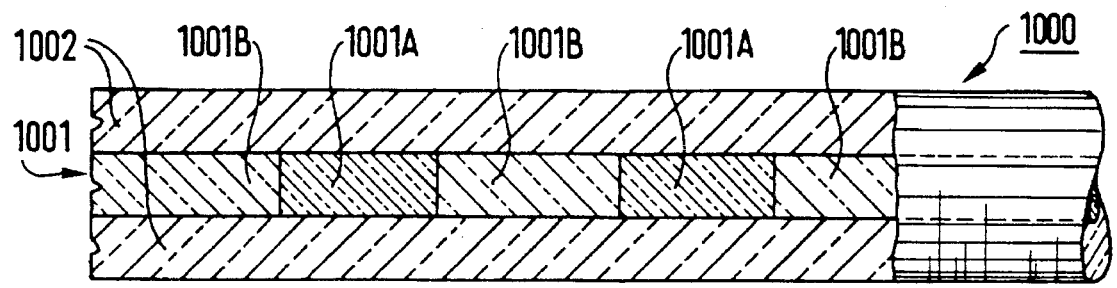
FIG. 10 shows in diagrammatic cross-section a third optical fiber made from a preform in accordance with the invention.

FIGS. 8, 9 and 10 are diagrams showing in longitudinal section optical fibers made by drawing preforms in accordance with the invention.

EXAMPLE 1

FIG. 8 shows part of a multimode optical fiber 800 having a core 801 and cladding 802. The protective plastics material jacket of the fiber is not shown.

The core 801 includes at least one special area 801A and one normal area 801B (only one special area and one normal area can be seen in FIG. 8). A plurality of special areas 801A can be disposed along the fiber 800, optionally at regular intervals, or at its ends. The composition of the multicomponent glass of the core 801 is such that the refractive index of the glass in the area 801B is different from the refractive index of the glass in the area 801A, the index of the core 801 in the areas 801A and 801B being greater than the index of the cladding 802, however. The index variations are obtained, for example, by adding a dopant to the parent glass of the areas 801A to increase or reduce the index.

The variation in the index of the core 801 between the areas 801A and 801B varies the numerical aperture from the special area 801A to the normal area 801B.

The numerical aperture NA of an optical fiber is defined by the equation:

$$NA = \sin \theta o = (n_c^2 - n_g^2)^{1/2}$$

where:

θo is the limiting angle for injection of light rays into the core of the fiber at the interface between the air and the core glass so that rays propagate inside the core by total internal reflection at the interface between the core glass and the cladding glass, $n_c$ is the index of the core glass, $n_g$ is the index of the cladding glass.

To the angle θo there corresponds a limiting angle $β_{lim}$ at the interface between the core glass and the cladding glass: beyond this limiting angle the rays are guided in the core.

The variations in numerical aperture can be exploited with benefit if the numerical aperture of a multimode optical fiber or the index difference between the core and the optical cladding of a monomode fiber are higher at the fiber entry than elsewhere in the fiber. This enables a higher luminous power to be injected into the fiber and certain higher order modes to be ejected into the cladding (some of the higher order modes are deliberately ejected immediately after entry into the optical fiber). When the injection angle at the fiber entry for the higher order modes is such that their angle of incidence at the interface between the core glass and the cladding glass is greater than the limiting angle associated with the special area at the fiber entry, and less than the limiting angle associated with the normal area, then the higher order modes are no longer guided in the core and are refracted into the cladding on passing from the special area to the normal area. The higher order modes refracted into the cladding also give rise to so-called cladding modes.

In the example shown, the refractive index $n_{cA}$ of the core 801 in the area 801A can be 1.5, for example, and the refractive index $n_{cB}$ of the core 801 in the area 801B is equal to 1.49, while the refractive index $n_g$ of the glass of the cladding 802 is 1.48.

The cladding modes are easy to eliminate by appropriate methods well-known to the person skilled in the art (for example by inserting the fiber into a liquid having an index higher than that of the cladding), or can be used to show the resulting diffusion of light into the protective plastics material jacket of the fiber or into any other light-sensitive covering. In the latter case the special areas act as sensors.

There are therefore many potential applications of an optical fiber of the fiber 800 type.

In a first application a fiber 800 type multimode fiber can be used with an entry special area 801A (index of the core in the special area higher than the index of the core in the normal area), the normal area 801B constituting the normal communication signal transmission medium. The presence of the special area 801A at the entry enables the luminous power injected to be increased. This can improve the coupling to a light source emitting into a very large angle. This avoids the need for a more directional but more costly source.

Increasing the luminous power injected into lines used for sensing can produce a higher power response signal which is a function of the power injected.

In a second feasible application the cladding modes are used rather than eliminated: the light rays of the higher order modes diffusing through the protective plastics material jacket of the fiber or through any other equivalent covering are made visible.

Making these rays visible can, for example, indicate that the angle at which the input light signal is injected exceeds a particular value, this method of sensing being usable in rotary surveillance devices associated with a source of luminous emission in relation to an optical sensing line. If there is a problem affecting the rotary device the angle at which the luminous signal is injected into the sensing line is modified to cause ejection of the higher order modes after the transition between the normal area and the special area. Sensing of diffusion of these higher order modes into the protective plastics material jacket of the fiber can indicate the existence of a problem and possibly locate it, for example.

A fiber of the fiber 800 type can also be used as a luminous signalling means: the light rays diffused into the cladding due to the higher order modes render the fiber luminous at certain places which can be arranged to provide the required signalling.

The disposition of the special area(s) along the fiber depends on the equipment in which it is used, the attenuation of the fiber and the quantity of the signal regularly ejected.

The index variation, or any composition variation, between special and normal areas is in practise not sudden but gradual. The index is increased and decreased progressively, which among other things means that some of the light rays can be regularly ejected.

The optical losses due to the transition between the special area 801A and the normal area 801B are negligible and represent only the losses by reflection between two media with different indices, apart from line losses due to the decrease in numerical aperture between the areas 801A and 801B.

With the index values given above by way of example, these losses are estimated at 0.001% ($5.10^{-6}$ dB) of the incident power in the fiber, while they would be around 2% (0.1 dB) if the transition were effected by means of an optical connector or a weld between two fibers of different kinds.

In the case of ZBLAN fluorinated glass, for example, the refractive index can easily be varied about the value 1.5 when making the core rod or the cladding tube(s) by the method described with reference to FIGS. 1 to 7. To increase the refractive index lead fluoride ($PbF_2$) can be added or sodium fluoride (NaF) removed. To reduce the refractive index $ZrF_4$ can be replaced with hafnium fluoride ($HfF_4$), the proportion of NaF increased or lithium fluoride (LiF) added. Given that modifying the composition of the parent glass can modify the physical properties of the initial glass (especially its glass transition temperature), it may be necessary to add other fluorides such as indium fluoride ($InF_3$) or yttrium fluoride (YF3) to the above type compositions to preserve these physical properties.

The same type of application may be feasible by locally increasing the index of the cladding glass instead of reducing that of the core glass. This also reduces the numerical aperture at the fiber entry.

A choice can also be made between the above alternatives (increasing the index of the cladding glass or reducing that of the core glass) according to the constituents of the cladding and core glass, the variations in the proportions of these constituents having to preserve the chemical stability of the glass and at the same time achieve the required index variations.

Another feasible alternative, in the same line of thinking, is to vary the index of the core glass and that of the cladding glass at the same time.

EXAMPLE 2

FIG. 9 shows part of an optical fiber 900 which has a core 901 and an inner optical cladding 902. The fiber 900 also has an outer optical cladding 903 which can, for example, be an additional second tube made by the method of the invention. The protective plastics material jacket of the fiber is again not shown.

The optical fiber 900 has a normal area 900A, a special area 900B and a transition area 900C between the normal and special areas 900A, 900B.

The index of the core glass in the normal area 900A is $n_{cA}$ while its index in the special area 900B is $n_{cB}$. The index of the glass of the inner cladding 902 in the normal area 900A is $n_{gA}$ and the index of the cladding glass in the special area 900B is $n_{gB}$. Finally, the index of the glass of the outer cladding 903 is $n_{gext}$.

In one possible embodiment of the invention the indices $n_{cA}$ and $n_{cB}$ are both equal to 1.5, the index $n_{gA}$ is equal to 1.495, the index $n_{gB}$ to 1.5 and the index $n_{gext}$ to 1.495.

In the transition area 900C the index of the inner cladding 902 increases progressively between the normal area 900A and the special area 900B from the value 1.495 to the value 1.5. In practise, in most fibers in accordance with the invention the transitions between the normal and special areas are achieved by progressive variation of the composition of the powder, causing a progressive variation in the optical properties of the fiber between the normal and special areas. There is therefore almost always a transition area like the area 900C.

In the special area 900B the effective core diameter is equal to the diameter of the inner cladding 902. To continue to confine the light rays in the core after the transition area 900C it is necessary to use the outer cladding 903 whose index is lower than that of the increased diameter "new core".

Thus, by virtue of the invention, the core diameter of an optical fiber can be varied, if necessary, without having to connect or weld together fibers with different core diameters.

To retain the monomode nature of the fiber 900, when the core diameter is increased due care must be exercised not to increase the monomode cut-off wavelength $\lambda_c$, which is the wavelength above which propagation in the fiber is monomode, defined by the following general equation:

$$\lambda_c \approx 2\pi a (2n_c \Delta n)^{1/2}/2.405$$

where:

<u>a</u> is the core radius, $n_c$ is the core glass index, $\Delta n$ is the index difference between the core glass and the cladding glass.

From the above equation, increasing the core diameter and therefore <u>a</u> without changing $n_c$ and $\Delta n$ causes a (usually unwelcome) increase in $\lambda_c$. To avoid this in the FIG. 9 example it is sufficient to choose the index $n_{gext}$, for example, to maintain $\Delta_c$ constant as <u>a</u> increases.

Fibers of the fiber 900 type can be used in many applications.

In a first type of application these monomode or multimode fibers can be used as sensors.

Generally speaking, optical fibers can sense the presence of gases and liquids to warn of a possible hazard or to control a process. This sensing is founded upon the principle of evanescent wave spectroscopy, which requires the use of fibers having an optical cladding that it thin in comparison to the core diameter.

Multimode fibers usually have an optical cladding that is thin in comparison to their core diameter. Evanescent waves conveyed by the cladding therefore interact with the medium surrounding the fiber, enabling sensing by evanescent wave spectroscopy. Portions of such fibers acting as sensors are usually inserted into an optical sensing line at the points where sensing or measurement is required.

Monomode fibers whose optical cladding has been machined to reduce its thickness at the places where the fiber is to be used as a sensor can also be used. These fibers are called D fibers because of their cross-section after machining. The machining takes a particularly long time and therefore is not feasible over long distances.

Instead, a fiber of the same type as the fiber 900 in accordance with the invention can be used in which the normal areas for propagating the sensing light signal are monomode and the special areas are multimode. Within the special areas the index of the inner cladding is made equal to that of the core by adding certain appropriate constituents during manufacture of the preform tube by the method described above.

It may be preferable to provide for only multimode propagation in the special area. To retain monomode propagation, given the increased diameter of the core and the requirement for the index difference between the core and the outer cladding to be below a minimal threshold so that monomode guidance can be maintained within the core, the diameter of the fiber itself would have to be small, to achieve a cladding glass thickness small enough for the required sensing. This would make the fiber too fragile.

Using a fiber in accordance with the invention avoids the problems of connecting a fiber portion acting as a sensor at various locations along the sensing line and the need for machining a long length of the fiber, weakening it.

Consequently, using a fiber of the same type as the fiber 900 in accordance with the invention it is possible to vary the relative thickness of the cladding over great lengths without problems using the method as previously described and special areas can be provided at various locations to act as sensors without significantly increasing the implementation time or the attenuation along the optical line.

Using fibers of the fiber 900 type, especially if made from fluorinated glass, is particularly beneficial if the requirement is to sense the presence of molecules which absorb infra red. Fluorinated glass fibers can be used in evanescent wave spectroscopy at infra red wavelengths between 2 μm and 4.6 μm. In this range of wavelengths the molecules to be sensed have fundamental vibration modes that are very often intense. Methane, for example, has very intense absorption bands around 2.4 μm and 3.4 μm. Fluorinated glass is therefore highly sensitive to methane in tiny amounts (e.g. 5%) in the medium surrounding the optical fiber, making evanescent wave spectroscopy possible in a given medium. A fiber 900 type fiber can therefore be used in the field of transportation or storage of methane, for example, or in mines, 5% being the maximum tolerable concentration of methane for which there is no explosion hazard.

The fluorinated glass fibers can sense many other specific substances in the infra red, for example carbon dioxide ($CO_2$ around 2.7 μm and 4.2 μm), hydroxyl ions ($OH^-$ around 2.9 μm), some anesthetic gases, oxygen ($O_2$), etc.

In a second type of application a monomode or multimode fiber 900 type fiber can be used to interconnect two optical fibers with different core diameters: there are then no real special or normal areas as such in the fiber, but rather two areas having different core diameters, one of which is equal to the core diameter of one of the optical fibers to be connected and the other of which is equal to the core diameter of the second optical fiber to be connected.

EXAMPLE 3

FIG. 10 shows part of a monomode optical fiber 1000 in accordance with the invention having a core 1001 and cladding 1002. The core 1001 has a plurality of special areas 1001A distributed regularly or otherwise between normal areas 1001B.

The normal areas 1001B are of fluorinated glass and the special areas 1001A are of the same fluorinated glass doped with praseodymium ions $Pr^{3+}$, for example. The use of fluorinated glass fibers with the core doped with praseodymium ions as optical amplifiers at wavelengths between 1.3

μm and 1.4 μm is well known, such optical amplifiers being usually connected to the fibers of an optical communication line.

To make a preform for a fiber like the fiber 1000 it suffices to add appropriate rare earths to the parent fluorinated glass over a particular length of the preform, i.e. for a particular duration of the manufacturing process, since the rate of displacement of the pedestal is known and from this it is possible to deduce the duration required to achieve the necessary variation in composition over a particular length of the preform, this length corresponding to a special area length within the fiber as the latter is homeomophic to the preform.

In the fiber 1000 in accordance with the invention, instead of connecting fiber portions acting as optical amplifiers, doped special areas 1000A are obtained by the method described above so that no long connection likely to increase the line attenuation is needed.

To amplify an optical signal at a wavelength between 1.3 μm and 1.4 μm the special area 1001A is pumped optically using a laser diode (not shown) emitting at around 1 μm, for example. This produces a power gain in the order of 30 dB.

The amplified light signal propagates in the fiber 1000 in the normal area 1001B downstream of the special area 1001A in which the optical pumping was applied. In theory the normal area 1001B is longer than the special area 1001A.

The normal areas 1001B can be in the parent fluorinated glass (in which case their attenuation is in the order of 0.3 dB/km at 1.3 μm) or doped with praseodymium ions, the concentration of $Pr^{3+}$ ions increasing regularly lengthwise of the special areas 1001A to compensate the intrinsic fiber losses. In the latter case, it is not necessary to obtain a very high gain at the output end of the special areas 1001A as the normal areas 1001B can themselves compensate in part for the reduction of gain. The lower gain enables the use of lower powered pump lasers which represents a saving in terms of the cost of the hardware and a reduction in system overall size.

With the invention it is not necessary for all the special areas 1001A to have the same dopant concentration. For example, there can be at the exit end of the fiber 1000 a special area 1001A with a higher concentration of praseodymium ions than the other special areas 1001A. By pumping from the exit end the propagated signal is amplified to produce an output signal of greater intensity. Amplifying the output signal rather than sensing it directly does not encounter any problems where the line is concerned since the special area at the end can be made the same way as the other special areas 1001A when making the fiber preform, and also enables the use of medium sensitivity and therefore inexpensive components at both ends of the fiber.

Any dopant can of course be used, depending on the application of the fiber.

Erbium ions ($Er^{3+}$) can be used to amplify wavelengths between 1.5 μm and 1.6 μm, for example.

Codopants such as $Pr^{3+}/Yb^{3+}$ or $Er^{3+}/Pr^{3+}$ can be used for improved amplification efficiency, for example.

In the method described above adding rare earths in the form of fluorides ($PrF_3$, $ErF_3$, $YbF_3$) to a parent fluorinated glass is no problem in practise.

Doping can produce in the fiber not only amplification but also lasing and frequency conversion.

Doping any multi-component glass with rare earth ions such as terbium $Tb^{3+}$, dysprosium $Dy^{3+}$, holmium $Ho^{3+}$, erbium $Er^{3+}$, neodymium $Nd^{3+}$ and praseodymium $Pr^{3+}$ gives the glass a high Verdet constant (in the order of 20 rad/T.m to 60 rad/T.m) producing a significant Faraday effect in the fibers when polarized light passes through the glass: the polarization of the light is rotated by an external magnetic field.

Terbium $Tb^{3+}$ ions can therefore be used to dope the fiber core to produce fibers for use as optical isolators (45° rotation of the polarization).

The $Dy^{3+}$, $Ho^{3+}$, $Er^{3+}$, $Nd^{3+}$ and $Pr^{3+}$ ions can also be used for this purpose. Like optical amplifiers, optical isolators are usually connected to the fibers of an optical communication line. They prevent reverse propagation of a spurious optical signal along the line, to preserve line performance.

Using the invention, if one or more special areas of the area 1001A type are doped in this way in-line optical isolators are obtained by placing magnets around the special areas and possibly by looping the special area on itself at each magnet. No connection of optical isolators is necessary and the resulting increase in attenuation is due in part to reflexion between two media of different composition, not losses due to coupling two optical fibers.

Because of its sensitivity to magnetic fields, because of the special areas doped as described above, a fiber like the fiber 1000, preferably of the maintained polarization type, including one or more special areas 1001A can be used as a remote sensor for strong interference magnetic fields: the rotation of the polarization of the light on passing through the doped special area is measured.

Another potential application of a fiber like the fiber 1000 is the sensing of low-level magnetic fields. For this application, when making a preform in accordance with the invention there is added to the special areas 1001A a magnetostrictive material (for example, nickel, a combined ferro- or ferrimagnetic fluoride, an appropriate magnetic alloy in the case of fluorinated glass) which is chosen to react to a limited extent with the molten seed mass. A magnetic field deforms this material dispersed in the glass matrix to cause a stress in the fiber which increases the attenuation of the light signal passing through the special area concerned.

In the prior art these sensors use a tube of nickel, for example, in contact with a portion of an optical fiber acting as a sensor. The possibility, through use of the invention, of including one or more intrinsic sensors in the fiber enables sensing over great distances, without lengthy and irksome preparations.

In another application the fiber 1000 can be used as a temperature sensor, some or all of its special areas 1001A being doped with rare earths. When subjected to intense luminous excitation, some rare earth ions fluoresce at a higher frequency that the original light. This phenomenon is known as "frequency conversion excited fluorescence".

When this phenomenon occurs in a fiber some of the energy emitted is backscattered towards the fiber entry and can therefore be sensed. The intensity of the fluorescence varies with the temperature of the surrounding medium: thus this phenomenon can be used to measure this temperature.

In the prior art multimode fibers are used for this application (they enable a greater luminous power to be injected at the outset). These fibers include, every 5 meters, for example, an added portion of fiber doped to act as a temperature sensor. The manufacture of a sensing line of this kind is naturally a lengthy procedure and the coupling losses are high. The invention can overcome both these problems.

When the special areas of a fiber of the invention are used as sensors the effect produced can be measured by measuring the optical transmission of the fiber or by reflectometry. Quantification and location of the effect produced are respectively dependent on the amplitude and the position of the additional attenuation observed or any other variation in the characteristics of the light signal transmitted.

In the prior art the insertion into a conventional optical fiber of fiber portions to act as sensors by connecting the ends of these portions to the sensing line usually causes additional optical losses in the order of 2% to 20% (0.1 dB to 1 dB) and usually requires an installation time in the order of several hours (including validation of the sensor).

With the invention the losses are only around 0.001% and there is a clear saving on installation time.

The invention is naturally not limited to the embodiment just described.

Firstly, the method described concerns fibers in which the parent glass is a fluorinated glass but clearly any other multi-component glass can be used, for example an oxide glass based on silica.

It is also possible to form in the same fiber several special areas with different compositions to obtain sensors responsive to different external phenomena on one and the same fiber.

When constituents are added or removed to form the special areas in a preform of the invention, there is in practise obtained on the fiber a progressive variation in the concentration of these constituents in the special areas, rather than sudden variations, as already mentioned hereinabove. These progressive variations in concentration (which are the origin of the progressive variations in the optical properties of the fiber, for example its index) can be exploited to compensate the attenuation of the optical signal along the special area, for example, if the response of the fiber is proportional to the concentration of the constituent added or removed and to the power of the incident signal: the sensitivity of the special area is then substantially constant over all of its length.

These progressive variations also enable precise location of the site at which an event to be sensed has occurred: the origin of the response along the special area can be established from the amplitude of the response.

Given that, in some cases, the length of the special area can be long, because of the manufacturing method adopted, it is often beneficial, when the special areas are used as sensors, to loop the fiber on itself to constitute a turn at each special area: this increase the sensitivity of the sensor consisting of the special area and enables it to be located accurately.

Finally, any means can be replaced by equivalent means without departing from the scope of the invention.

We claim:

1. A method of manufacturing a multi-component glass cylindrical part, comprising the following operations:

providing a cylindrical member having at least one cylindrical wall defining a vertical cylindrical cavity where a surface, facing an interior of said cavity, of said wall is lined with a porous layer, where an inside dimension of said porous layer is a few tens of microns larger than said glass cylindrical part and in which a cylindrical pedestal constituting a support for said glass cylindrical part can slide, providing a solid seed mass of said glass on said pedestal, heating said seed mass until said seed mass melts, thereby forming a molten seed mass, and injecting gas continuously into said porous layer thereby forming and maintaining a layer of said gas between said porous layer and said molten seed mass, said layer of said gas being a few tens of microns thick preventing any contact between said inner walls of said cylinder and said molten seed mass, feeding said molten seed mass from a top end of said cavity by continuously dispensing a powder made up of components thereby forming said glass cylindrical part, and varying the composition of the powder as said glass cylindrical part is formed, thereby varying the composition of said glass cylindrical part in a longitudinal direction, lowering said pedestal as said glass cylindrical part is formed from said seed mass.

2. A method according to claim 1, wherein said step of varying the composition of said power made up of the components to form said glass cylindrical part comprises adding one or more components to a powder made up of parent components at predetermined times during said method of manufacturing.

3. A method according to claim 1, wherein said feeding step by continuously dispensing said powder comprises feeding said powder by straight feed means oriented towards the top of said cavity.

4. A method according to claim 1, wherein said feeding step by continuously dispensing said powder comprises feeding said powder by helical feed means oriented towards the top of said cavity.

5. A method according to claim 1, wherein:

said pedestal comprises a hollow cylindrical body having a piston disposed at a bottom end of said piston, said pedestal closing said bottom end of said pedestal, and said method further comprises the step of extracting said molten seed mass gradually from said pedestal by pushing up said piston.

6. A method according to claim 1, wherein said piston is covered with a layer of pyrolytic carbon.

7. A method according to claim 1, wherein said lowering of said pedestal step occurs in said cavity with said layer of said gas between said porous membranes and outside surfaces of said pedestal.

8. A method according to claim 1, further comprising, during said injecting step, regulating gas pressure in said porous layers to maintain in said cavity under steady state conditions a stable column of said molten seed mass of constant height.

9. A method according to claim 1, wherein said glass cylindrical part being formed is surmounted by a column of said molten glass and an interface at the glass transition temperature is substantially level with a bottom end of said layers.

10. A method according to claim 1 wherein said porous layers are made of graphite with a DARCY permeability approximately $10^{-15}$ $m^2$.

11. A method according to claim 10 wherein said porous layer is covered with a thin layer of pyrolytic carbon.

12. A method according to claim 1 wherein all surfaces contacting said glass cylindrical part of said pedestal are covered with a thin layer of pyrolytic carbon.

13. A method according to claim 1, wherein:

said cylindrical member has a second cylindrical wall disposed within said at least one cylindrical wall to define an annular cylindrical member, where a surface, facing said at least one cylindrical wall, of said second wall is lined with a second porous layer, said cylindrical part is a tube, said porous layer lining said surface of said wall facing said interior of said cavity and said second porous layer are coaxial, and said pedestal is annular.

14. A method according to claims 13, wherein said porous layer and said second porous layer have the same thickness and equal pressures are applied to the inside and outside of the glass cylindrical part being formed.

15. Method according to claim 1 wherein said cylindrical part is a rod, said cavity is tubular and hollow, said pedestal is tubular.

* * * * *